United States Patent [19]

Tamaru

[11] 4,184,173
[45] Jan. 15, 1980

[54] COLOR TELEVISION RECEIVING APPARATUS

[75] Inventor: Hideshi Tamaru, Sagamihara, Japan

[73] Assignee: Sony Corporation, Tokyo, Japan

[21] Appl. No.: 826,200

[22] Filed: Aug. 19, 1977

[30] Foreign Application Priority Data

Aug. 23, 1976 [JP] Japan .............................. 51-100341

[51] Int. Cl.² ......................................... H04N 9/537
[52] U.S. Cl. ...................................... 358/10; 358/27; 358/40
[58] Field of Search ..................... 358/10, 27, 28, 40

[56] References Cited

U.S. PATENT DOCUMENTS

| 3,624,279 | 11/1971 | Curtis | 358/27 |
| 3,943,560 | 3/1976 | Freestone | 358/40 |
| 3,950,780 | 4/1976 | Freestone | 358/28 |
| 4,059,838 | 11/1977 | Banker et al. | 358/27 |
| 4,096,515 | 6/1978 | Brown, Jr. et al. | 358/28 |

OTHER PUBLICATIONS

Babcoke–At Last! Automatic Color–Electronic Servicing, Jul. 1976–pp. 30–32.

*Primary Examiner*—Robert L. Griffin
*Assistant Examiner*—Joseph A. Orsino, Jr.
*Attorney, Agent, or Firm*—Lewis H. Eslinger; Alvin Sinderbrand

[57] ABSTRACT

A color television receiver for receiving a composite color television signal of the type having a chrominance component and which may include a VIR signal having a chrominance reference signal, comprises an input circuit, such as a band-pass amplifier, for receiving the chrominance signal and the chrominance reference signal, a chrominance demodulator for transforming the chrominance signal into red, blue, and green color signals, a video image display for presenting the color signals as a video picture, and a chrominance channel providing a pathway for the chrominance signal and chrominance reference signal between the input circuit and the chrominance demodulator. Included in the chrominance channel are first and second variable gain control circuits. A VIR-signal sensitive circuit is included to control the first variable gain control circuit in accordance with the amplitude of the chrominance reference signal. The second variable gain control circuit, interposed between the first variable gain control circuit and the demodulator, is selectively adjustable to provide preference adjustment of the amplitude of the chrominance signal. In the described embodiment, a level detector is included in advance of the second gain control circuit to provide to the VIR-signal sensitive circuit a level corresponding to the level of the chrominance reference signal.

7 Claims, 4 Drawing Figures

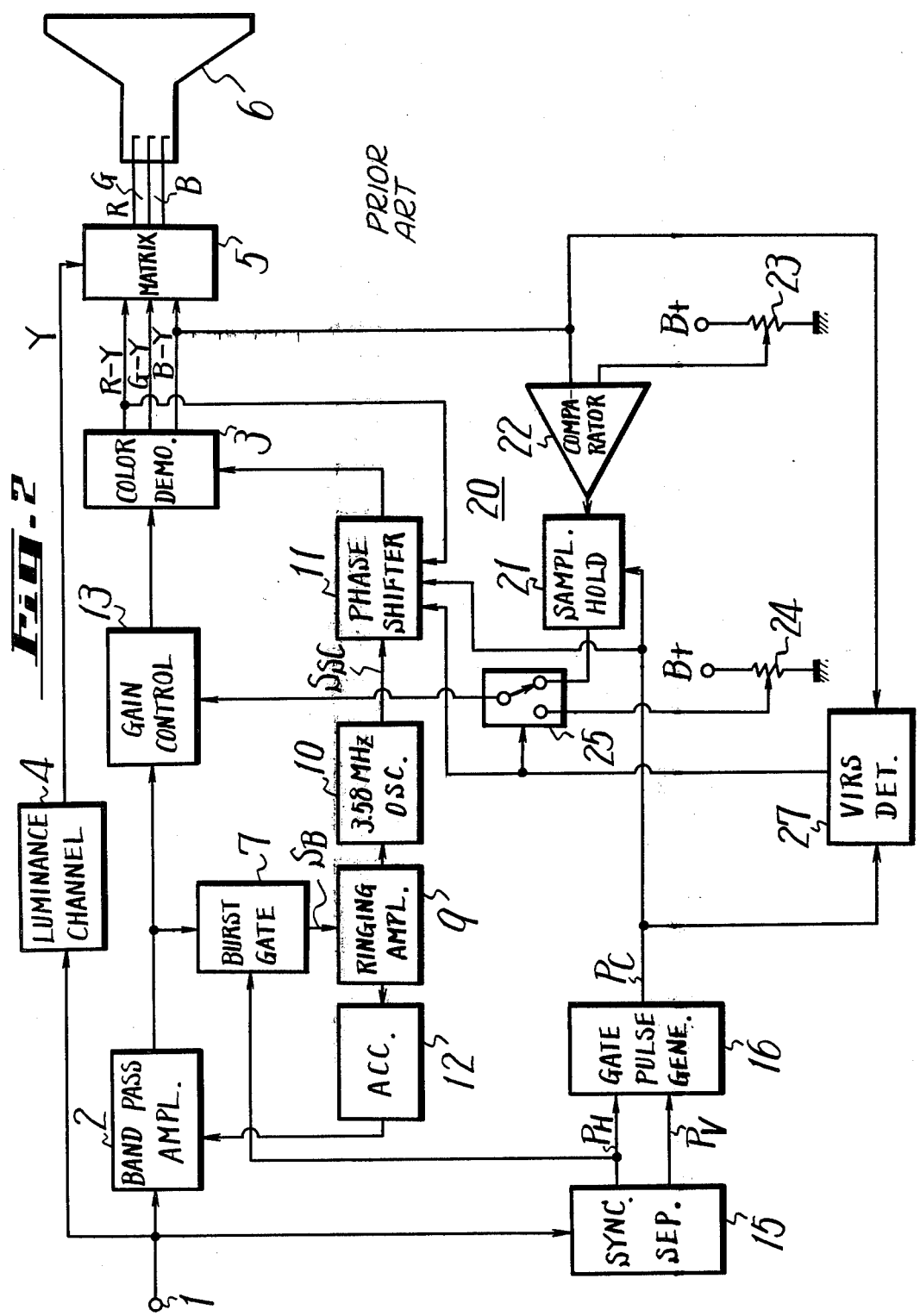

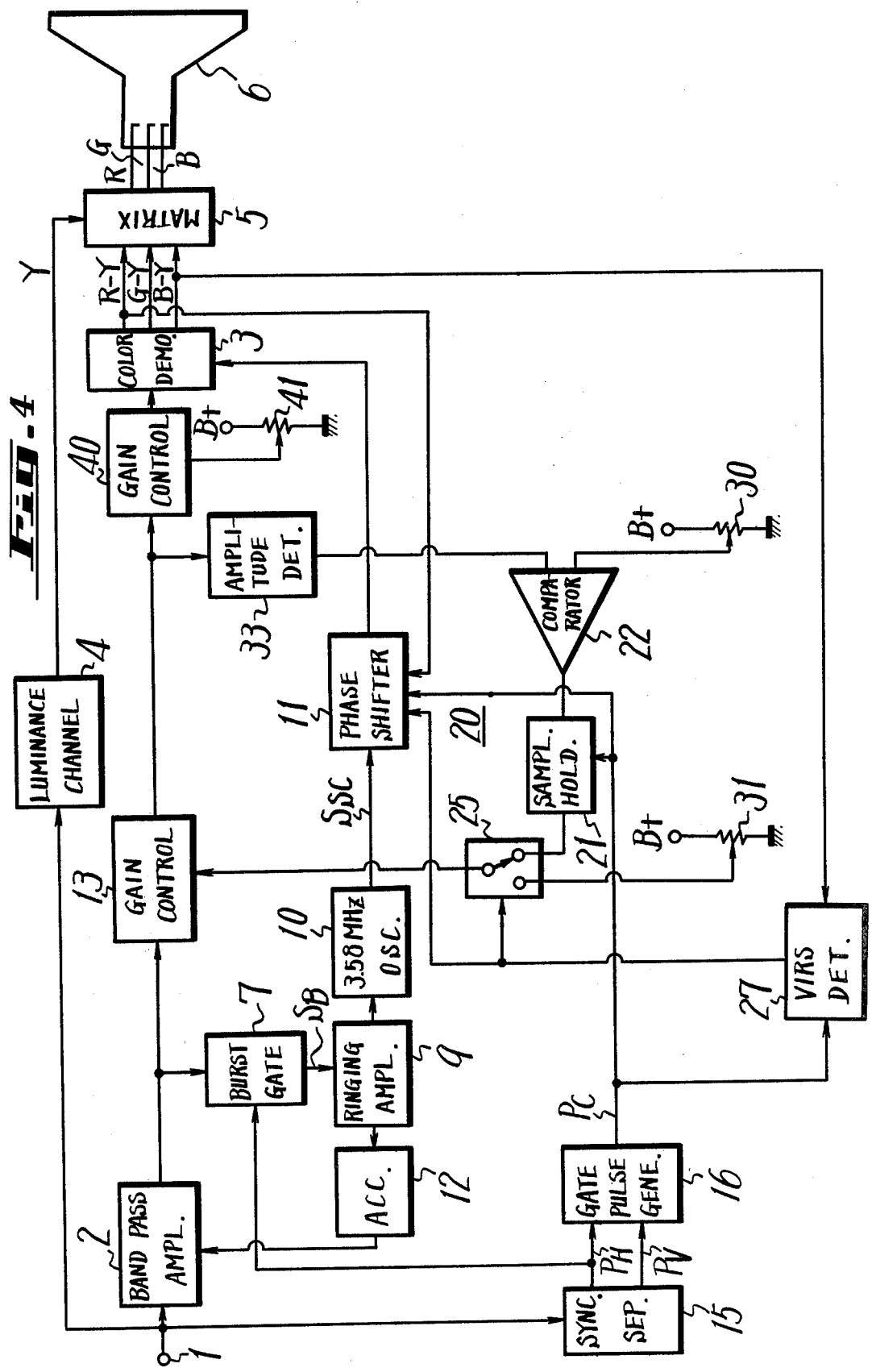

COLOR TELEVISION RECEIVING APPARATUS

BACKGROUND OF THE INVENTION

1. Field of the Invention

The present invention relates generally to a color television receiving apparatus, and more particularly to a color television receiving apparatus in which the color saturation level is automatically corrected by a vertical interval reference signal.

2. Description of the Prior Art

In a conventional color television receiver, it is well known that a chrominance signal passed through a band-pass amplifier can be applied through a variable gain control circuit to a color demodulator circuit and, when a received composite color television signal includes a so-called vertical interval reference (VIR) signal, an amplitude error of the VIR signal is detected from the demodulated output of the color demodulator circuit and the aforementioned variable gain control circuit is controlled in its gain by the detected output, thereby automatically correcting the color saturation level. In this case, when the correction is made by means of the VIR signal, the color saturation level is held constant.

However, as viewer's favorite color levels are often different from one another, viewers may wish to further adjust even the automatically corrected color saturation level so as to preferentially adjust the same to each viewer's own preferred level.

OBJECTS AND SUMMARY OF THE INVENTION

Accordingly, it is an object of the present invention to provide a color television receiving apparatus capable of preferentially adjusting the color saturation level, when the same undergoes automatic correction by control of the VIR signal, the preference adjustment of the color saturation level being achieved by a single adjusting knob regardless of whether the VIR signal is present or absent.

According to an aspect of the present invention, a color television receiver for receiving a composite color television signal arranged in horizontal and vertical scanning intervals, and including a chrominance signal, the composite color television signal being of the type which may additionally include a vertical internal reference (VIR) signal provided in a predetermined horizontal scanning interval during the vertical scanning intervals, which VIR signal includes a chrominance reference signal, comprises an input circuit, such as a band-pass amplifier, providing the chrominance signal and the chrominance reference signal, a chrominance demodulator for transforming the chrominance signal into red, green, and blue color signals, a video image display for presenting the color signals as a video picture, a chrominance channel providing a pathway for the chrominance signal and the chrominance reference signal between the input circuit and chrominance demodulator, a first variable gain control circuit included in the chrominance channel, a VIR-signal sensitive circuit for controlling the gain of the first variable gain control circuit and thereby controlling the amplitude of the chrominance signal in accordance with the amplitude of the chrominance reference signal, and a second variable gain control circuit whose gain is selectively adjustable and which is interposed in the chrominance channel between the first variable gain control circuit and the chrominance demodulator. The amplitude of the chrominance signal is thus adjustable according to the preference of a viewer regardless of the presence of VIR signals.

In a desirable embodiment, the VIR-sensitive circuit includes an amplitude detector connected in advance of the second variable gain control circuit for providing an indication of the level of the chrominance reference signal that is unaffected by any adjustment made thereto by the second variable gain control circuit.

The other objects, features and advantages of the invention will become apparent from the following detailed description taken in conjunction with the accompanying drawings.

BRIEF DESCRIPTION OF THE DRAWINGS

FIG. 2 is a block diagram of a prior art color television receiver in which the color saturation level is automatically corrected by the VIR signal;

FIG. 4 is a block diagram showing one embodiment of the color television receiving apparatus according to the present invention.

DETAILED DESCRIPTION OF THE PREFERRED EMBODIMENT

Figure 1:
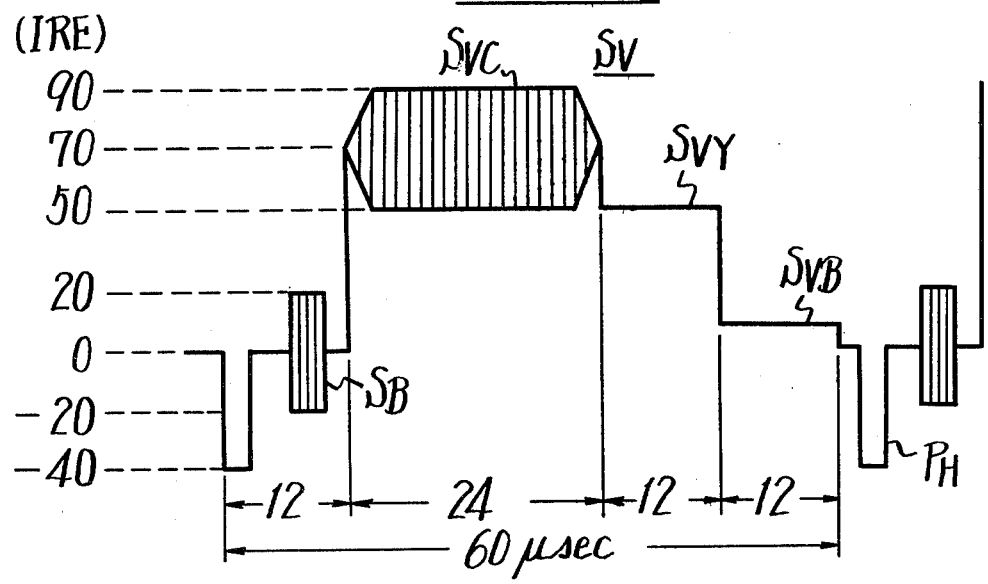
FIG. 1 is a waveform diagram showing one example of the VIR signal.

Referring to FIG. 1, there is shown a waveform of a video detected output signal in the 19th horizontal interval (within vertical retrace interval) at each vertical period, in which $P_H$ represents a horizontal synchronizing signal, $S_B$ a burst signal and $S_V$ a VIR signal, as a whole. The VIR signal $S_V$ consists of a chrominance reference signal $S_{VC}$, a luminance reference signal $S_{VY}$, and a black reference signal $S_{VB}$ in sequence. Assuming that the pedestal level is expressed by 0 IRE (luminance level) and the maximum white level by 100 IRE, the peak-to-peak value of the burst signal $S_B$ is selected as 40 IRE.

The chrominance reference signal $S_{VC}$ is a sinusoidal wave signal of 3.58 MHz similar to the burst signal $S_B$ and also has the same amplitude and phase as does the burst signal $S_B$. This chrominance reference signal $S_{VC}$ is superimposed upon the luminance level, 70 IRE, of the average flesh tone. The level of the luminance reference signal $S_{VY}$ is selected as 50 IRE, and that of the black reference signal $S_{VB}$ as 7.5 IRE, respectively.

Since the amplitude of chrominance reference signal $S_{VC}$ corresponds to that of the average flesh tone, the color saturation level with flesh tone as its center can be made constant by controlling this amplitude to conform to a fixed level.

When the average flesh tone undergoes phase distortion, the chrominance reference signal $S_{VC}$ also suffers like phase distortion. Therefore, the phase shift of the chrominance reference signal $S_{VC}$ with respect to the burst signal $S_B$ corresponds to the phase distortion of the average flesh tone. Accordingly, by controlling the demodulation axis in a color demodulator circuit in accordance with this phase shift, it is possible to correct the hue aberration with the flesh tone as a center caused by the phase distortion.

Referring to FIG. 2, there is shown a conventional color television receiver having a correction circuit using such a VIR signal. In this prior art receiver, an antenna, not shown, receives a composite color television signal including horizontal and vertical synchronizing signals, a color burst signal, a luminance signal and a chrominance signal. This composite color television signal received by the antenna is of the type having an additional VIR signal that is provided at a predetermined line interval during the vertical retrace interval, and the VIR signal includes a chrominance reference signal as described above.

At a terminal 1 is applied a color video signal that is produced in a video detector circuit (not shown), and this color video signal is fed to a band pass amplifier 2 from which is derived a chrominance signal, which is then applied through a variable gain control circuit 13 to a color demodulator circuit 3.

The chrominance signal is further applied to a burst gate circuit 7 from which the color burst signal $S_B$ is derived. The color burst signal $S_B$ is fed through a ringing amplifier 9 to an oscillator 10 where a continuous sub-carrier signal $S_{SC}$ of 3.58 MH$_z$ is produced. The sub-carrier signal $S_{SC}$ is applied through a variable phase shifter 11 to color demodulator circuit 3.

The color demodulator circuit 3 thus produces, for example, three color difference signals of R-Y, G-Y and B-Y, which are then applied to a matrix circuit 5 together with a luminance signal Y obtained through a luminance channel 4 which is supplied with the color video signal from terminal 1. The matrix circuit 5 thus produces color component signals R, G and B of red, green and blue, respectively, which are then delivered to a color cathode ray tube 6.

Figure 3:
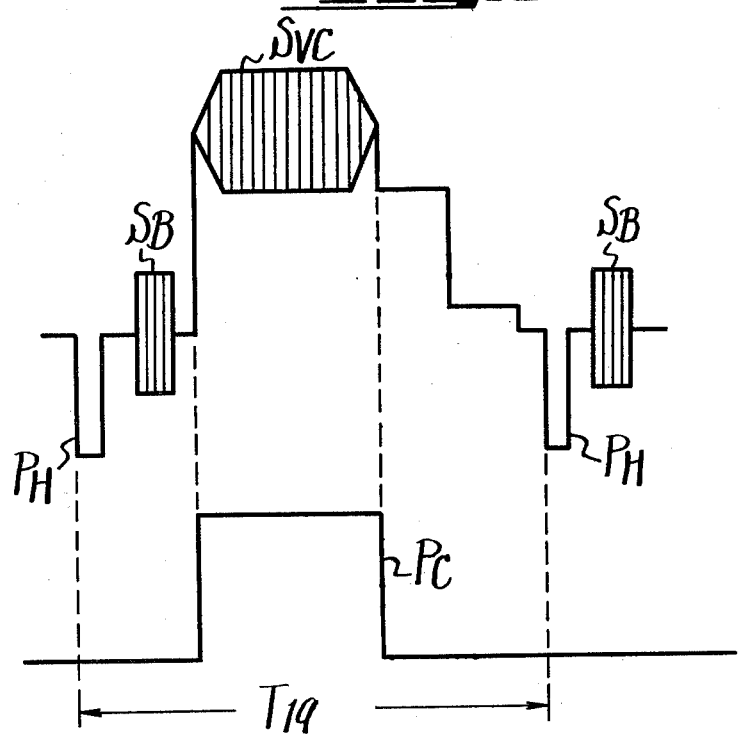
FIG. 3 is a waveform diagram to which reference is made in explaining the operation of the color television receiver shown by FIG. 2.

Shown at 12 is an automatic chrominance control (ACC) circuit which is supplied with the signal from the ringing amplifier 9 and supplies the output to band pass amplifier 2 to control its gain and at 15 a synchronizing signal separator circuit which is supplied with the color video signal from terminal 1 and produces the horizontal synchronizing signal $P_H$ and a vertical synchronizing signal $P_V$. The horizontal synchronizing signal $P_H$ is fed to burst gate circuit 7. Also, the horizontal and vertical synchronizing signals $P_H$ and $P_V$ are fed to a gate pulse generator circuit 16 to produce therefrom a gate pulse $P_C$ for gating the interval of the chrominance reference signal $S_{VC}$ in the 19th horizontal period during each vertical interval as illustrated in FIG. 3.

Generally shown at 20 is a color correction circuit using the chrominance reference signal $S_{VC}$. In order to correct color hue, it is necessary to detect the phase shift of the chrominance reference signal $S_{VC}$ with respect to the burst signal $S_B$ and to correct the demodulation axis in the color demodulator circuit 3 in accordance with the phase shift. This phase shift corresponds to the output level of the chrominance reference signal $S_{VC}$ of the demodulated output R-Y obtained from the color demodulator circuit 3. Therefore, the demodulated output R-Y is supplied to variable phase shifter 11 of which the amount of phase shift is thus controlled in accordance with the output level of the chrominance reference signal $S_{VC}$ of this demodulated output R-Y resulting from the supply of the gate pulse $P_C$ from gate pulse generator 16 to phase shifter 11. This causes the demodulation axis in color demodulator circuit 3 to be corrected, thereby achieving the automatic correction of color hue.

In order to correct the color saturation level, it is necessary to detect the amplitude of the chrominance reference signal $S_{VC}$ and to correct according to this amplitude the level of chrominance signal to be applied to color demodulator circuit 3. The amplitude of chrominance reference signal $S_{VC}$ corresponds to the output level of the chrominance reference signal $S_{VC}$ of the demodulated output B-Y produced from color demodulator circuit 3. Therefore, the demodulated output B-Y is applied through a comparator circuit 22 to a sampling hold circuit 21 where only the interval of chrominance reference signal $S_{VC}$ of the demodulated output B-Y is sampled by the gate pulse $P_C$ produced from gate pulse generator circuit 16 and applied to sampling hold circuit 21 and the sampled value is held therein. The output of the sampling hold circuit 21 is applied through a switching circuit 25 to variable gain control circuit 13 to control its gain, thereby enabling the color saturation level to be automatically corrected to a constant value.

The provision of the comparator circuit 22 is for the purpose of setting reference level or zero reference level. A predetermined DC level corresponding to this reference level is determined by a semifixed (factory-present) resistor 23.

If a composite color television signal without a VIR signal $S_V$ is received, switching circuit 25 is automatically switched so that the variable gain control circuit 13 does not provide automatic correction and in this case, manual adjustment of chrominance saturation can be performed. Shown at 24 is a variable resistor for the manual adjustment, the voltage therefrom being applied to switching circuit 25. Shown at 27 is a VIR signal detector circuit, which is supplied with the modulated output B-Y from color demodulator 3 and which detects the presence or absence of the chrominance reference signal $S_{VC}$ by gate pulse $P_C$ applied from gate pulse generator circuit 16 to detector 27. The output of the detector circuit 27 is used as a switching signal for the switching circuit 25; as described above, in the presence of VIR signal $S_V$, the switching circuit 25 is changed over to the illustrated condition, but in the absence of VIR signal $S_V$ switching circuit 25 is changed over to the side contacting variable resistor 24. Thus, in the absence of VIR signal $S_V$, the gain of the variable gain control circuit 13 can be changed by adjusting the variable resistor 24 externally, such as by adjusting a knob on a control panel, thereby enabling the color hue to be freely adjusted in accordance with a viewer's preference. The manual adjustment of color hue can be performed quite similarly, though not shown.

In order that this receiver has the ability to provide adjustment, according to viewer's preference to the color saturation level which is automatically corrected by VIR signal $S_V$, it is necessary that the resistor 23 is not semifixed but can be selectively adjusted externally. If the reference level obtained from resistor 23 is changed, the output level of comparator circuit 22 varies even when level of demodulated output R-Y does not change, thus altering the gain of variable gain control circuit 13. Consequently, viewers are able to perform the preference adjustment for color saturation level.

However, this results in the fact that the receiver must be provided with two knobs on the control panel thereof for the preference adjustment of saturation in the respective cases of presence and absence of VIR signals and hence viewers have to select one of the knobs to adjust in each case. Therefore, the adjustment becomes complicated and provides a means for introducing error.

FIG. 4 shows one example of the color television receiving apparatus according to the present invention, in which the same elements as those of FIG. 2 are identified with like reference numerals.

In the example of FIG. 4, resistors 30 and 31, which correspond to resistors 23 and 24 of the prior-art receiver shown in FIG. 2, respectively, are semifixed (factory-preset) to provide the respective reference levels, but can not be adjusted externally.

The variable gain control circuit 13 serves as a first variable gain control circuit, which delivers the chrominance signal through a second variable gain control circuit 40 to color demodulator circuit 3. The gain of the second variable gain control circuit 40 is changed by adjusting a variable resistor 41 for which an adjusting knob is mounted on the control panel of the color television signal receiving apparatus.

On the other hand, the chrominance signal derived from first variable gain control circuit 13 is applied to an amplitude detector circuit 33 and the detected amplitude is provided as the output therefrom to comparator circuit 22; in this case, the modulated output B-Y from color demodulator circuit 3 is not applied to the comparator 22.

According to the color television signal receiving apparatus of the invention constructed as described above, the signal adjusting knob thus provided enables the preference adjustment of color saturation level both in the presence and absence of VIR signal $S_V$. That is, upon the reception of a composite color television signal without VIR signal $S_V$, though the gain of the first variable gain control circuit 13 is unchanged, that of the second variable gain control circuit 40 can be changed by adjusting variable resistor 41, thereby enabling the chrominance signal supplied to color demodulator circuit 3 to be controlled in level. As a consequence, viewers can freely change the color saturation level in accordance with their preference. Meanwhile, upon the reception of a composite color television signal containing VIR signal $S_V$, the gain of the first variable gain control circuit 13 is controlled in accordance with the amplitude of the chrominance reference signal $S_{VC}$ that is detected by amplitude detector circuit 33, thereby automatically correcting the color saturation level. Also, since the gain of the second variable gain control circuit 40 can be changed by adjusting variable resistor 41, the automatically corrected color saturation level can be further adjusted in accordance with the viewers' preference.

In the receiver of the invention shown in FIG. 4, if the detection of the amplitude of the chrominance reference signal $S_{VC}$ is achieved by utilizing the demodulated output B-Y of color demodulator circuit 3 without the provision of amplitude detector circuit 33 as illustrated in FIG. 2, the second variable gain control circuit 40 is in effect, located within a closed loop for the automatic correction by the chrominance reference signal $S_{VC}$. This results in the detection of the amplitude of chrominance reference signal $S_{VC}$ that is preferentially adjusted in the second variable gain control circuit 40. In the first gain control circuit 13, the gain is thus controlled to cancel out the preferentially adjusted amount. As a result, since the preference adjustment can not be performed, the level of the chrominance reference signal $S_{VC}$ must be sampled in advance of the second gain control circuit 40, and it is necessary to additionally provide the amplitude detector circuit 33 for detection, as illustrated.

The above described example represents a single preferred embodiment of the invention, but it will be apparent that many modifications and variations could be effected by one skilled in the art without departing from spirit or scope of the novel concepts of the invention, and, therefore, the scope of the invention should be determined by the appended claims.

What is claimed is:

1. Color television receiving apparatus for receiving a composite color television signal including horizontal and vertical synchronizing signals respectively defining horizontal and vertical scanning intervals, a color burst signal, a luminance signal, and a chrominance signal, the composite color television signal being of the type which may additionally include a VIR signal provided in a predetermined horizontal scanning interval at least certain ones of said vertical scanning intervals, with the VIR signal including a chrominance reference signal; said color television receiving apparatus comprising input means for receiving said chrominance signal and said chrominance reference signal, demodulator means for transforming said chrominance signal into a plurality of color signals, display means for presenting a video picture in response to said color signals, chrominance channel means providing a pathway for said chrominance signal between said input means and said demodulator means, first variable gain control means included in said channel means for controlling the amplitude of said chrominance signal, VIR-signal sensitive means for controlling said first variable gain control means in accordance with the amplitude of said chrominance reference signal, and selectively adjustable second variable gain control means included in said channel means between said first variable gain control means and said demodulator means for adjusting the amplitude of said chrominance signal in accordance with the preference of a viewer regardless of the presence of said VIR signal.

2. Color television receiving apparatus according to claim 1; wherein said VIR-signal sensitive means includes amplitude detector means having an input connected in advance of said second gain control means and providing a detected level corresponding to the level of said chrominance reference signal, and means for controlling said first gain control means in response to said detected level.

3. Color television receiving apparatus according to claim 1; wherein said second variable gain control means includes a variable resistor connected to a reference potential and having a variable contact selectively adjustable to provide a gain control level for controlling said second gain control means.

4. Color television receiving apparatus according to claim 3; wherein said variable resistor is adjustable at the exterior of the color television receiving apparatus.

5. Color television receiving apparatus according to claim 1; wherein said VIR-signal sensitive means includes comparator means for comparing the level of the chrominance reference signal with a first reference level and providing an output based on the comparison between said levels, means providing a second reference level, and switch means connected with said comparator means, said means providing a second reference level and said first variable gain control means, said switch means being actuated in response to the presence of VIR signals in the composite color television signal, so that, when said VIR signal is present, said first gain control means is controlled by the output of said comparator means, and when said VIR signal is absent, said first gain control means is controlled by said second reference level.

6. Color television receiving apparatus according to claim 5; wherein said means providing a second reference level includes a second variable resistor connected to a source of reference level and having a variable contact which is permanently preset to provide said second reference level.

7. Color television receiving apparatus according to claim 5; wherein said VIR sensitive means includes another variable resistor connected to a source of a reference level and having a variable contact which is permanently preset to provide said first reference level.

* * * * *